United States Patent
Moren et al.

(10) Patent No.: US 8,767,626 B2
(45) Date of Patent: Jul. 1, 2014

(54) POWER REDUCTION FOR CORRELATED CARRIERS IN A CELLULAR COMMUNICATION SYSTEM

(75) Inventors: Lennart Moren, Bastad (SE); Anders Wallen, Ystad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 434 days.

(21) Appl. No.: 13/277,286

(22) Filed: Oct. 20, 2011

(65) Prior Publication Data

US 2013/0100880 A1    Apr. 25, 2013

(51) Int. Cl.
*H04W 4/00*    (2009.01)

(52) U.S. Cl.
USPC .......................................................... 370/328

(58) Field of Classification Search
USPC .......................................... 370/328, 334, 318
See application file for complete search history.

(56) References Cited

U.S. PATENT DOCUMENTS

2010/0239031 A1   9/2010   Wallen

FOREIGN PATENT DOCUMENTS

| EP | 1940034 B1 | 7/2008 |
|---|---|---|
| WO | 2011070460 A1 | 6/2011 |
| WO | 2011076258 A1 | 6/2011 |
| WO | 2011100622 A1 | 8/2011 |

OTHER PUBLICATIONS

International Search Report, mailed May 15, 2013, in connection with International Application No. PCT/SE2012/000160.
3GPP TS 25.113, V10.2.0 Technical Specification Group Radio Access Network; Base Station (BS) and repeater ElectroMagnetic Compatibility (EMC), Release 10, Sep. 2011.

*Primary Examiner* — Dang Ton
*Assistant Examiner* — Kevin Lee
(74) *Attorney, Agent, or Firm* — Leffler Intellectual Property Law, PLLC; Kenneth B. Leffler

(57) ABSTRACT

A wireless communication transmitter configured to transmit a multi-carrier signal, the multi-carrier signal being an aggregation of two or more separately modulated carriers occupying distinct frequency regions is operated by obtaining a baseline multi-carrier metric indicative of an amount by which a multi-carrier signal's maximum transmit power should be reduced from a pre-determined nominal maximum to satisfy a predetermined out-of-band emission requirement when different scrambling codes are used on all carriers that are combined to create the multi-carrier signal. A compensating metric adjustment value that compensates for an estimation error that results from use of a same scrambling code on two or more of the carriers is estimated. A final multi-carrier metric is obtained by adjusting the baseline metric by an amount based on the compensating metric adjustment value when the same scrambling code is used on the two or more of the carriers.

30 Claims, 4 Drawing Sheets

POWER REDUCTION FOR CORRELATED CARRIERS IN A CELLULAR COMMUNICATION SYSTEM

BACKGROUND

The present invention relates to cellular communication systems, and more particularly to reducing maximum transmit power in radiocommunication equipment that utilizes a plurality of correlated carriers.

Cellular communication systems typically comprise a land-based network that provides wireless coverage to mobile terminals that can continue to receive service while moving around within the network's coverage area. The term "cellular" derives from the fact that the entire coverage area is divided up into so-called "cells", each of which is typically served by a particular radio transceiver station (or equivalent) associated with the land-based network. Such transceiver stations are often referred to as "base stations". As the mobile device moves from one cell to another, the network hands over responsibility for serving the mobile device from the presently-serving cell to the "new" cell. In this way, the user of the mobile device experiences continuity of service without having to reestablish a connection to the network. FIG. 1 illustrates a cellular communication system providing a system coverage area 101 by means of a plurality of cells 103.

The radiofrequency spectrum that is utilized to provide mobile communication services is a limited resource that must be shared in some way among all of the users in a system. Therefore, a number of strategies have been developed to prevent one mobile device's use (both transmitting and receiving) of radio spectrum from interfering with that of another, as well as to prevent one cell's communications from interfering with those of another. Some strategies, such as Frequency Division Multiple Access (FDMA) involve allocating certain frequencies to one user to the exclusion of others. Other strategies, such as Time Division Multiple Access (TDMA) involve allowing multiple users to share one or more frequencies, with each user being granted exclusive use of the frequencies only at certain times that are unique to that user. FDMA and TDMA strategies are not mutually exclusive of one another, and many systems employ both strategies together.

Yet another means for sharing radiofrequency resources is Code Division Multiple Access (CDMA). In CDMA, all users can share a radiofrequency resource at the same time. In order to prevent one user's transmissions from interfering with those of another, each pair of users (transmitter and receiver) is allocated one of a set of predefined orthogonal spreading codes. Each spreading code is a sequence of digital bits having a higher bit rate than that of the user's data to be communicated. The transmitting user's digital data is effectively multiplied by the spreading code (e.g., by means of an "exclusive OR"—"XOR") to create a higher rate stream of bits that can be considered to represent either a "+1" or a "−1", and it is this higher rate "spread" data that is transmitted over the shared radiofrequency resource.

To receive the underlying data, a receiver correlates the received signal against the same assigned spreading code. Due to orthogonality between spreading codes, the codes of other users will cause their signals to appear as noise, so that the correlation between the assigned spreading code and those user's signals will effectively be zero. Only the signal that the receiver is trying to receive will have a correlation of either "+1" or "−1", and in this manner the underlying data is extracted from the received signal.

The above discussion presents CDMA concepts in relatively simplistic terms. In practice, there are many other aspects that are employed, which are well known to those of ordinary skill in the art, such as (and not limited to) the combined use of both so-called "channelization codes" (which separate transmissions from a single source) and so-called "scrambling codes" (which separate terminals or base stations from each other).

A number of communication systems have been standardized to include an air interface that relies on CDMA technology. One of these is Wideband-CDMA (WCDMA), which, in the single carrier case, transmits on a pair of 5 MHz-wide radio channels. To facilitate the reader's understanding of the various concepts discussed herein, terminology associated with the well-known WCDMA system is used herein. However, the various concepts discussed herein are not limited to use only in WCDMA systems, but are instead more generally applicable to any communication system having comparable features.

Power control is another important aspect of mobile communication systems. Too little transmission power can prevent a transmitter from being heard over the transmissions of others. By contrast, too much transmission power can not only drown out the transmissions of others, but can also unnecessarily waste power (which is especially detrimental in a battery powered device) and can also put unnecessarily strict requirements on the linearity of the transmitter's circuitry.

The maximum transmit power in WCDMA is the minimum of the Universal Terrestrial Radio Access Network (UTRAN) signaled "allowed" maximum power and the power class determined "nominal" maximum power. The nominal maximum power is defined by the power class. In dual (or multi-) carrier operation, a transmitter simultaneously transmits on two (or more) separately modulated carriers, each of which occupies a distinct frequency region. The maximum user equipment (UE) transmitter power for dual (or multi-) carrier operation is defined as the total power on both (or all) carriers.

The nominal maximum power may be reduced by a configuration dependent amount that is called "maximum power reduction" ("MPR"). (In some texts, this is also referred to as a "back-off metric".) Allowing the UE to reduce the maximum power makes it easier for the UE to satisfy transmitter requirements in terms of, for example and without limitation, Adjacent Carrier Leakage Ratio (ACLR) (which is a ratio of the power emitted in an intended channel to the power leaked into a certain nearby channel) and Error Vector Magnitude (EVM). This reduces the transmitter linearity requirements, in particular for the power amplifier. This, in turn, leads to reduced costs in terms of chip area and power consumption.

The MPR in WCDMA systems is computed based on a so-called "Cubic metric". The Cubic metric is the root-mean-square (RMS) value of the cubed waveform (after power normalization) expressed in decibels (dB), reduced by an offset of 1.52 dB, and then scaled by a configuration dependent scale factor. The scale factor is 1.85 for single carrier configurations using only the lower half of the code tree, 1.56 for other single carrier configurations, and 1.66 for dual carrier configurations. The offset and scale factors were selected so that the Cubic metric approximates the required back-off. The Cubic metric definition by the Third Generation Partnership Project (3GPP) also includes a quantization step. The present discussion, however, will consider this quantization instead to be part of the MPR computation, and the Cubic metric will refer to the non-quantized entity.

The Cubic metric depends mainly on the channel configuration, but to some extent also on the scrambling code and the transmitted symbols. The channel configuration is described by the number of different physical channels and their gain factors (power offsets), type of modulation (Binary Phase Shift Keying ("BPSK"), 4-level Phase-Amplitude Modulation ("4PAM")), branch under consideration ("In-Phase" ("I") or "Quadrature Phase" ("Q")), channelization codes and spreading factors. The channel configuration, for the case of dual carriers, is also described by the power offsets between carriers. The branch and channelization code for each physical channel is specified based on the number of different physical channels. This means that the Cubic metric mainly depends on the number of different physical channels, their gain factors, the power offset between carriers, modulation and spreading factors.

The UE needs to know the allowed MPR for each possible configuration. The Cubic metric can be dynamically computed or (to save processing power) precomputed and stored in a lookup table when only single carriers are involved. In theory, the introduction of dual carriers essentially means that each single carrier configuration may be combined with any configuration on the second carrier, for any power offset between the carriers. This would result in about $[8.5 \text{ million}]^2$ possible dual carrier configurations. However, the standard disallows most combinations so that, in practice, the number of configurations for dual carrier operation increases from about 8.5 million to about 300 million per power offset between carriers. Consequently, when dual carriers are involved, practical embodiments require that the Cubic metric be approximated (i.e., rather than computed). To take just one of a number of possible examples, approximating the Cubic metric can be based on the Cubic metrics of the corresponding carriers.

As disclosed in U.S. Patent Publication No. US-2010/0239031, which is hereby incorporated herein by reference in its entirety, the Cubic metric for dual carriers can be well approximated based on the per carrier Cubic metric using an affine map. Such a map can be parameterized in several possible ways. Herein, the following map is used:

$$k \cdot CM = a_0 + a_1 \cdot k_1 \cdot CM_1 + a_2 \cdot k_2 \cdot CM_2 \quad (1)$$

where the parameters $a_0$, $a_1$, $a_2$ vary with the relative power difference between the carriers and the scaling factors k, $k_1$, $k_2$ are the scaling factors specified by 3GPP to be used for Cubic metric computation for dual carriers, primary carrier and secondary carrier, respectively. This approximation method, basically, reduces the number of considered configurations back to the single carrier case. The circuitry merely needs to compute, or alternatively lookup in a table, the Cubic metrics for each carrier individually, and then combine these in accordance with the equation to approximate the corresponding Cubic metric for the dual- (or more generally multi-) carrier case. FIG. 2 is a graph illustrating coefficients for the affine mapping between Cubic metrics on individual carriers to the Cubic metric for the whole signal.

The above described approximation method works well when the scrambling codes on the two carriers are different, with a typical approximation error that is less than 0.1 dB. However, when the same scrambling code is used on both carriers then the approximation error may be up to about 0.5 dB. The reason is that correlation between the signals on the two carriers has an impact on the Cubic metric. This means that conventional techniques require that a huge number of configurations must be considered to determine the MPR when the same scrambling code is used on both carriers.

It is therefore desired to have methods and apparatuses that overcome the disadvantages determining MPR when several carriers are employed, two or more having the same scrambling code.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for operating a wireless communication transmitter configured to transmit a multi-carrier signal, the multi-carrier signal being an aggregation of two or more separately modulated carriers occupying distinct frequency regions. Such operation comprises obtaining a baseline multi-carrier metric indicative of an amount by which a multi-carrier signal's maximum transmit power should be reduced from a pre-determined nominal maximum transmit power to satisfy a predetermined out-of-band emission requirement when different scrambling codes are used on all carriers that are combined to create the multi-carrier signal. A compensating metric adjustment value is estimated that compensates for a multi-carrier metric estimation error that results from use of a same scrambling code on two or more of the carriers that are combined to create the multi-carrier signal. A final multi-carrier metric indicative of the amount by which the multi-carrier signal's maximum transmit power should be reduced from the pre-determined nominal maximum transmit power to satisfy the predetermined out-of-band emission requirement is obtained by, under at least some circumstances, adjusting the baseline multi-carrier metric by an amount based on the compensating metric adjustment value when the same scrambling code is used on the two or more of the carriers that are combined to create the multi-carrier signal. The final multi-carrier metric is used to at least partially control a transmit power level of the wireless communication transmitter.

In some but not necessarily all embodiments, obtaining the final multi-carrier metric comprises ascertaining whether the same scrambling code is used on the two or more of the carriers that are combined to create the multi-carrier signal; using the baseline multi-carrier metric as the final multi-carrier metric if it is ascertained that different scrambling codes are used on all carriers that are combined to create the multi-carrier signal; and adjusting the baseline multi-carrier metric by the amount based on the compensating metric adjustment value when the same scrambling code is used on the two or more of the carriers that are combined to create the multi-carrier signal.

In some but not necessarily all embodiments, obtaining the baseline multi-carrier metric indicative of the amount by which the multi-carrier signal's maximum transmit power should be reduced from the pre-determined nominal maximum transmit power to satisfy the predetermined out-of-band emission requirement when different scrambling codes are used on all carriers that are combined to create the multi-carrier signal comprises obtaining, for each of the two or more carriers, a carrier-specific metric indicative of an amount by which the maximum transmit power on that carrier should be reduced from the pre-determined nominal maximum transmit power, if transmitted alone, to achieve the pre-determined out-of-band emission requirement; and estimating the baseline multi-carrier metric based on the two or more carrier-specific metrics obtained.

In some but not necessarily all embodiments, obtaining the baseline multi-carrier metric comprises obtaining a multi-carrier cubic metric, a multi-carrier peak-to-average power ratio, or a multi-carrier maximum-power reduction value.

In some but not necessarily all embodiments, obtaining the baseline multi-carrier metric comprises calculating the baseline multi-carrier metric or retrieving the baseline multi-carrier metric from a lookup table, based at least in part on one or more configuration parameters of the multi-carrier signal. In some but not necessarily all of these embodiments, obtaining the baseline multi-carrier metric comprises calculating the baseline multi-carrier metric or retrieving the baseline multi-carrier metric from a lookup table, based at least in part on scrambling codes of the multi-carrier signal; and/or calculating the baseline multi-carrier metric or retrieving the baseline multi-carrier metric from a lookup table, based at least in part on a respective value of one or more transmitted symbols conveyed by the multi-carrier signal.

In some but not necessarily all embodiments, estimating the compensating metric adjustment value comprises calculating the compensating metric adjustment value, or retrieving the compensating metric adjustment value from a lookup table, based at least in part on one or more configuration parameters of the multi-carrier signal. In some but not necessarily all of these embodiments, the one or more configuration parameters include any one or a combination of:
  a scrambling code of the multi-carrier signal
    gain factors for physical channels in a Wideband Code-Division Multiple Access (WCDMA) signal;
    one or more power ratios between the two or more separately modulated carriers; and
    channelization codes of physical channels used by the multi-carrier signal.

Further, in some but not necessarily all of these embodiments, the compensating metric adjustment value is one of a set of constants. In some but not necessarily all of these embodiments, the constants are weighted depending on one or more power ratios between the two or more separately modulated carriers.

In some but not necessarily all embodiments, adjusting the baseline multi-carrier metric by an amount based on the compensating metric adjustment value when the same scrambling code is used on the two or more of the carriers that are combined to create the multi-carrier signal comprises adding a bias to the baseline multi-carrier metric.

In some but not necessarily all embodiments, estimating the compensating metric adjustment value that compensates for the multi-carrier metric estimation error that results from use of the same scrambling code on two or more of the carriers that are combined to create the multi-carrier signal comprises forming the compensating metric adjustment value, CM_offset, as a weighted sum of tentative compensating metrics for all pairs, or a subset of all pairs, of present channels with specific channelization codes, wherein weights applied in the weighted sum are a function of a relative power of each physical channel within the physical channel's carrier or are alternatively a function of a relative power of each physical channel within the total power of all carriers combined. In some but not necessarily all of these embodiments, the multi-carrier signal is an aggregation of two separately modulated carriers occupying distinct frequency regions, the two separately modulated carriers being herein denoted carrier 1 and carrier 2; and forming the compensating metric adjustment value, CM_offset, is in conformance with:

$$\mathrm{CM\_offset} = \sum_{k,l} \frac{P_{1,k} P_{2,l}}{P_{tot}^2} \cdot 4 \cdot \mathrm{CM\_offset}_{i,j}$$

where the summation indices k and l are iterated over all physical channels for carrier 1 and 2, or a subset of all physical channels for carrier 1 and 2, respectively; $P_{1,k}$ and $P_{2,l}$ are absolute powers of channels k and l on respective carriers 1 and 2; $P_{tot}$ is a total power of all channels on both carriers; and $\mathrm{CM\_offset}_{i,j}$ is the tentative compensating metric when channels k and l have channelization codes i and j, respectively.

In some but not necessarily all embodiments, estimating the compensating metric adjustment value that compensates for the multi-carrier metric estimation error that results from use of the same scrambling code on two or more of the carriers that are combined to create the multi-carrier signal comprises forming the compensating metric adjustment value, CM_offset, as a weighted sum of tentative compensating metrics for all pairs of present channels whose power satisfies a predetermined relationship with a predetermined threshold value and that have specific channelization codes, wherein weights applied in the weighted sum are proportional to a relative power of each physical channel within the physical channel's carrier.

In some but not necessarily all embodiments, estimating the compensating metric adjustment value that compensates for the multi-carrier metric estimation error that results from use of the same scrambling code on two or more of the carriers that are combined to create the multi-carrier signal comprises forming the compensating metric adjustment value, CM_offset, as a weighted sum of tentative compensating metrics for all pairs of present channels whose tentative compensating metric satisfies a predetermined relationship with a predetermined threshold value and that have specific channelization codes, wherein weights applied in the weighted sum are proportional to a relative power of each physical channel within the physical channel's carrier.

DETAILED DESCRIPTION

Figure 1:
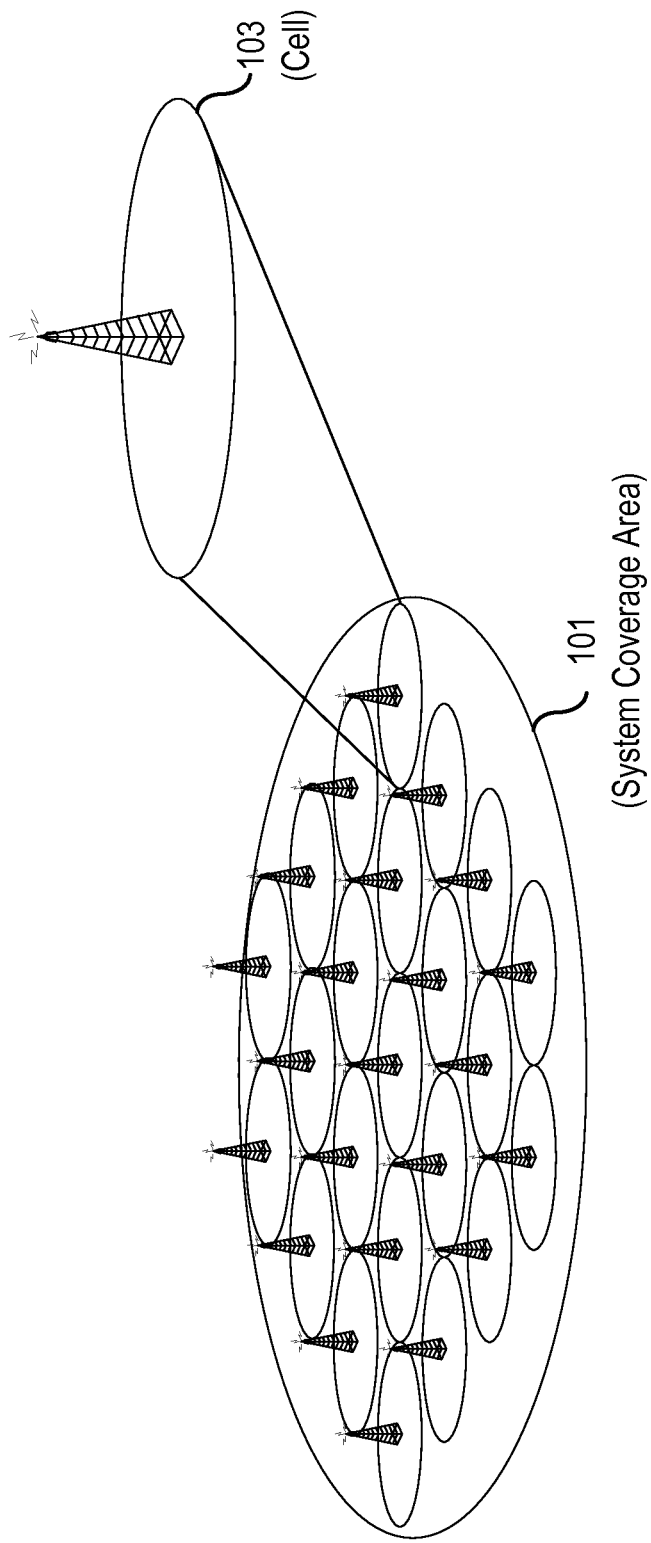
FIG. 1 illustrates a cellular communication system providing a system coverage area by means of a plurality of cells.
Figure 2:
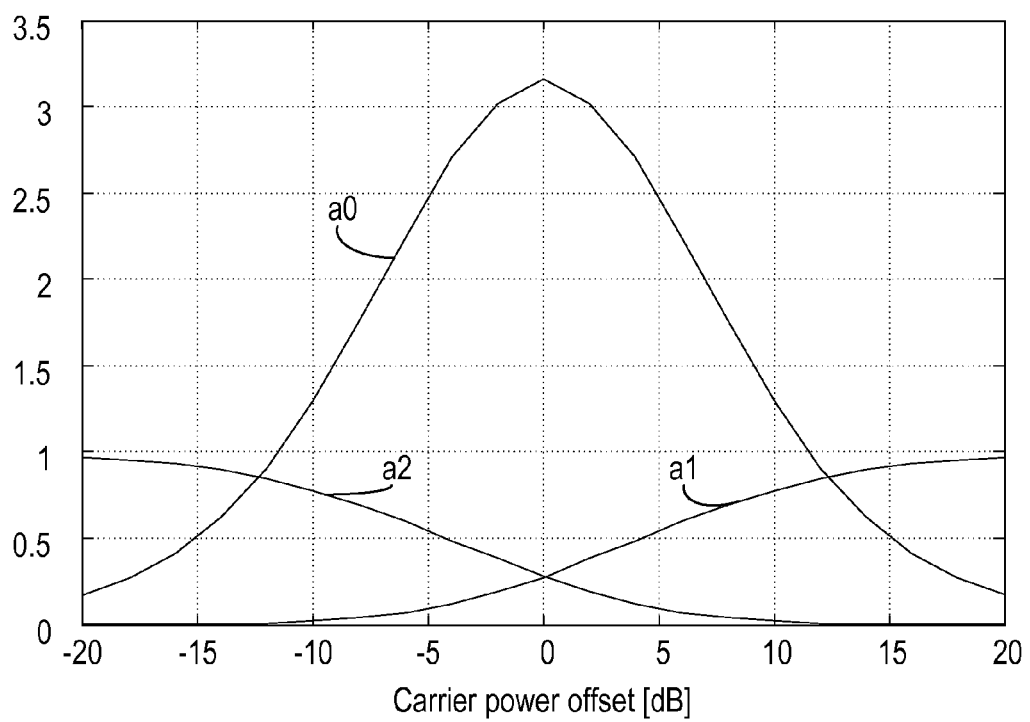
FIG. 2 is a graph illustrating coefficients for the affine mapping between Cubic metrics on individual carriers of a multi-carrier signal to the Cubic metric for the whole multi-carrier signal.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, UE circuitry determines the maximum transmit power to be applied in the dual- (or multi-) carrier scenarios by first determining a baseline metric by means of known available methods, such as, but not limited to, those described in the above-referenced U.S. Patent Publication US-2010/0239031. The metric can take on any of a number of forms, such as a Cubic metric, a peak-to-average-power ratio (PAPR), or an MPR value. These known approximation (as opposed to full computation) methods are derived with an underlying assumption that different scrambling codes are utilized on each of the carriers. However, as explained above, the known methods are characterized by relatively large approximation errors when the same scrambling code is used on two or more of the carriers. Consequently, in an aspect of embodiments consistent with the invention, if it is ascertained that the same scrambling codes are being utilized on two or more of the carriers, a compensating adjustment is made to the baseline metric. The adjustment is determined based on a few key properties that are related to the amount of correlation between the several carriers, such as characteristics of the channel configuration and/or other properties of the transmitted signal. This technique of generating a baseline metric assuming that different scrambling codes are used on all of the signals and then applying a computationally simple adjustment to compensate for the same scrambling code being used on several signals results in a considerable simplification compared to considering all parameters in the dual- or multi-carrier configuration.

These and other aspects will now be described in further detail below.

Figure 3:
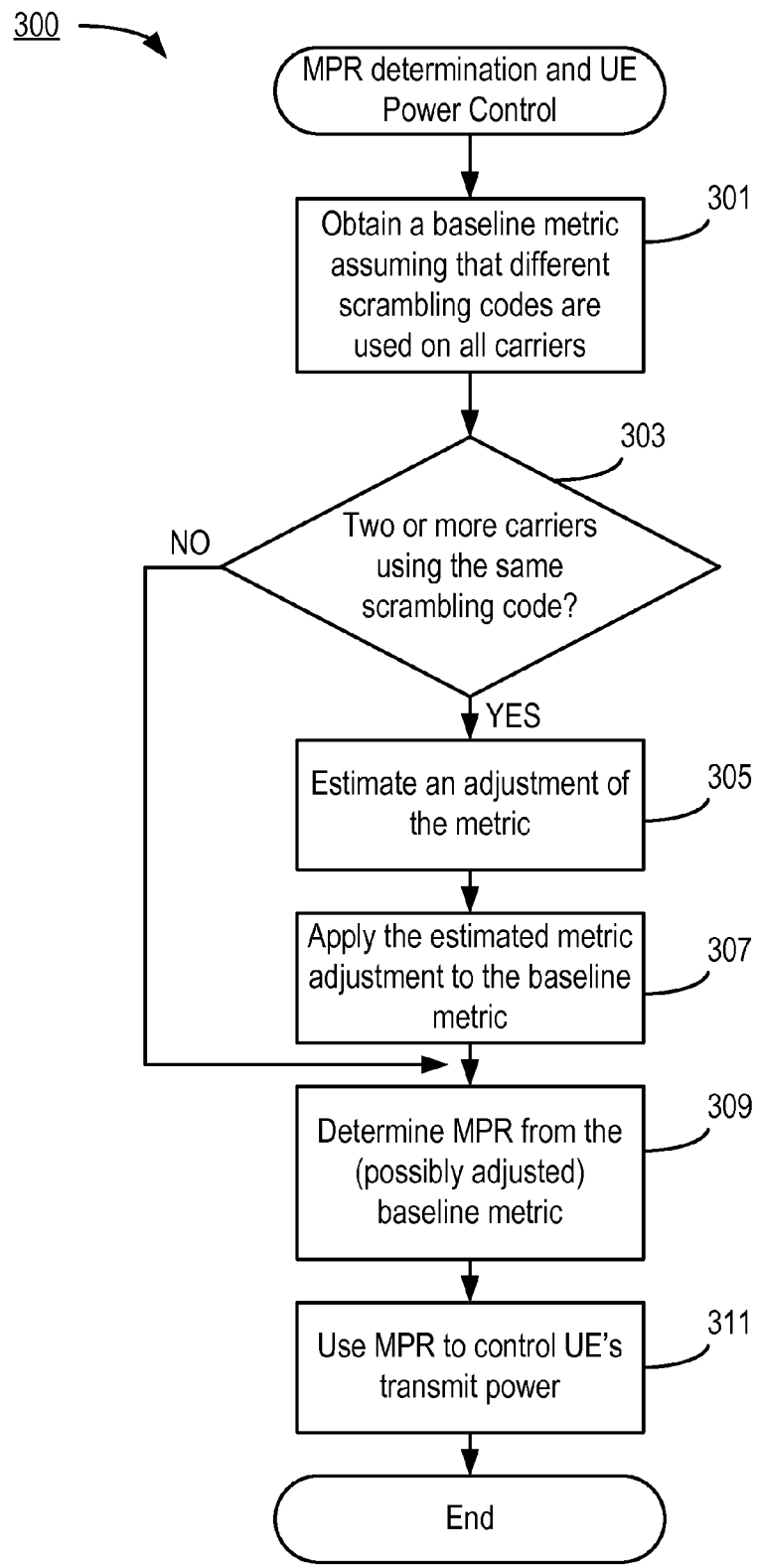
FIG. 3 is, in one respect, a flow chart of steps/processes performed by a UE (or other mobile device) in accordance with exemplary embodiments of the invention.

FIG. 3 is, in one respect, a flow chart of steps/processes performed by a UE (or other mobile device) in accordance with exemplary embodiments of the invention. In another respect, FIG. 3 can be considered to depict exemplary means 300 comprising the various illustrated circuitry configured to perform the described functions.

Initially, a baseline metric (e.g., a Cubic metric) is obtained (e.g., by computation or by table lookup) that assumes that different scrambling codes are used on all of the transmitter's carriers (step 301). The baseline metric can be computed by known estimation techniques, such as but not limited to those described in the above-referenced US Patent Publication No. 2010/0239031. Exemplary techniques are described further below.

Next, ascertaining circuitry decides whether two or more carriers are using the same scrambling code (decision block 303). If not ("NO" path out of decision block 303), then processing skips to block 309, where the baseline metric is used to determine the MPR by means of known techniques. Then, the MPR is used, again by known techniques, to control the UE's transmit power (step 311).

Returning to a discussion of decision block 303, if it is ascertained that two or more carriers are using the same scrambling code, this means that the larger amount of correlation between the signals will reduce the accuracy of the estimated baseline metric. Consequently ("YES" path out of decision block 303), a compensating metric adjustment value is estimated by techniques that are more fully discussed below (step 305). The estimated metric adjustment value is then applied to the baseline metric (step 307), and it is from this adjusted metric that the MPR is determined (step 309). Once the MPR is determined, it is used, by known techniques, to control the UE's transmit power (step 311).

The discussion will now focus on techniques for estimating the compensating metric adjustment value mentioned above with respect to step 305.

The correlation and thus the adjustment between carriers are in one embodiment of the invention described by a selected set of properties or parameters characterizing a channel configuration. The inventors have found that there may be a significant impact on the Cubic metric if both carriers have similar power and both have a power dominant physical channel. By this is meant dual carrier configurations that are close to the extreme configuration having one physical channel on each carrier, each of the channels having similar power. This means that both carriers should have a power dominating channel (a channel using most of the transmit power on that carrier) and power balance between the two carriers (the total transmit power per carrier should be similar).

The statement can be further generalized: There is an impact on the Cubic metric if each carrier is power dominated by either one or more control channels (physical channels in the lower part of the code tree with a high spreading factor) or a single E-DPDCH with a high spreading factor (physical channel in the upper part of the code tree with a high spreading factor)

The following discussion focuses on the case involving dual carriers, but those of ordinary skill in the art will readily be able to adapt the disclosed principles to embodiments involving two or more carriers having the same scrambling code, in cases with more than two carriers.

In one embodiment, the power difference between the carriers is utilized to determine the compensating metric adjustment value. Larger adjustments of the metric are applied if the power difference is small. The adjustment may be done in discrete steps or continuously.

In another embodiment, the gain factors for the individual physical channels are utilized to determine the compensating metric adjustment value. Larger adjustments of the metric are applied if one or a few physical channels have most of the power. The adjustment may be done in discrete steps or continuously.

In yet another embodiment, the relative power between physical channels and carriers, collected from the strongest physical channels on both carriers, is utilized to determine the compensating metric adjustment value. The adjustment may be done in discrete steps or continuously. It can, for example, be said that if the power of the dominating channel on one carrier in relation to the total power on the same carrier is above a threshold, for example −2 dB, then an adjustment is applied. In another example, the sum of the power of the dominating channels on both carriers in relation to the total transmit power is compared to a threshold in order to determine whether to apply an adjustment. Alternatively, the value of the adjustment may be gradually increased based on the total power on the strongest channels.

Transmitted symbols for physical channels with a high spreading factor vary in the same way as the spreading code. The spreading code is given by the combination of the scrambling code and the channelization code. The data symbols on channels with a large spreading factor are of less importance. In WCDMA systems, the channelization code is a sequence of length equal to the spreading factor, SF, and can be uniquely categorized by the spreading factor and the channelization code number, which is a number between 0 and SF-1. (The interested reader can consult 3GPP TS 25.113 for details.) If the channelization code number is small, then it is mainly the scrambling code that determines the variations as the channelization code is constant most of the time. If on the other hand the channelization code number is large, then there is also an impact due to the channelization code. Thus, when combining two carriers with identical scrambling codes, the combined variations of the signal will depend on both the spreading factors and the channelization code numbers utilized on each carrier. For instance, if low channelization code numbers are used on both carriers, the Cubic metric is increased. If instead the channelization code number on one of the carriers is changed to SF/4, corresponding to the channelization code $(1,1,-1,-1,1,1,-1,-1, \ldots )$, the Cubic metric is decreased. Furthermore, the larger the value of the spreading factor, the longer the time that the two carriers will vary in a correlated way, and the magnitude of the Cubic metric change will increase accordingly.

The inventors of the subject matter described herein have accordingly recognized that the spreading factor can be used to determine the compensating metric adjustment value. Large adjustments of the metric are applied if the spreading factor on the dominant channel(s) is large.

The inventors of the subject matter described herein have also recognized that the channelization code number can also be used to determine the adjustment value.

In an example embodiment the Cubic metric is considered. The baseline Cubic metric is adjusted when the total power, collected from the strongest physical channels on both carriers and being relatively balanced between the carriers, is above a threshold of, for example, −2 dB, and the spreading factors on both those channels is large, for example at least 8. The Cubic metric approximation is increased by, for example, 0.34 dB if the channelization code numbers of the strongest channels on both carriers are small; on the other hand, the Cubic metric approximation is decreased by, for example, 0.21 dB if the channelization code number of the strongest channel on one of the carriers is large. The magnitude of these adjustment values may, for example, be determined by performing simulations of a large number of different dual carrier configurations, and recording the distribution of the approximation errors for configurations that fulfill the specified criteria. The adjustment values may then be based on these distributions, for example, their average values. Simulations with a large set of randomized dual carrier configurations with equal power on the two carriers have shown that typical approximation errors can be as high as 0.5 dB when no compensation methodology is used. By using the two rules for compensation described above, the typical residual approximation errors for the same set of configurations can be reduced to below 0.2 dB. The adjustment values may, in addition, be determined by the power difference between the carriers, such that the magnitude of the compensation becomes smaller as the power difference increases.

In yet other exemplary embodiments, information about the type of physical channel is used to determine the compensating metric adjustment value. The compensating metric adjustment value may, for example, depend on whether the physical channel is a control channel such as a dedicated Physical Control CHannel (DPCCH), Enhanced dedicated channel-Dedicated Physical Control CHannel (E-DPCCH) or a High Speed-Dedicated Physical Control CHannel (HS-DPCCH) or a data channel such as the Enhanced dedicated channel-Dedicated Physical Data CHannel (E-DPDCH). The control channels are each characterized by fixed spreading factor (SF) and channelization code number, whereas E-DPDCH may use different spreading factors, and the channelization code number is set to SF/4 except when SF=2, in which case it is instead set to SF/2. Thus, considering that a channelization code is defined by the spreading factor together with the channelization code number, one may use the channelization code to characterize how the different physical channel types may influence the compensation metric adjustment value. In some embodiments utilizing this characterization, tentative compensating metrics are derived for the simplified cases in which the dual-carrier signal consists of one single physical channel using specific channelization codes on each carrier, the channels having equal power relative to one another. These metrics may, for example, be derived from a simulation that indicates the difference between the Cubic metric value when identical scrambling codes are used and when different scrambling codes are used. For all such possible pairs of channelization codes, the tentative compensating metrics can, for example, be arranged in a look-up table, such as the following:

|  |  | Carrier 2 channelization code | | | |
| --- | --- | --- | --- | --- | --- |
|  |  | #1 | #2 | ... | #N |
| Carrier 1 channelization code | #1 | 0.5 | 0.5 | ... | −0.3 |
|  | #2 | 0.5 | 0.5 | ... | −0.3 |
|  | ... | ... | ... | ... | ... |
|  | #N | −0.3 | −0.3 | ... | 0.2 |

In this example, channelization codes #1, #2, and #N may correspond to DPCCH, E-DPCCH, and E-DPDCH with SF=4, respectively. Several different physical channels may also be lumped into the same category if they yield similar tentative compensating metrics.

In the following discussion, CM_offset$_{i,j}$ is used to denote the tentative compensating metric corresponding to the entry in the table when carrier 1 consists of only one channel with channelization code i, and carrier 2 consists of only one channel with channelization code j. In one embodiment, a compensation metric, CM_offset, for the complete dual-carrier signal is then formed as a weighted sum of tentative compensating metrics for all pairs of present channels with specific channelization codes, where the weight is proportional to the relative power of each of the constituent physical channels. This can be written mathematically as $$\text{CM\_offset} = \sum_{k,l} \frac{P_{1,k} P_{2,l}}{P_{tot}^2} \cdot 4 \cdot \text{CM\_offset}_{i,j}$$

where the summation indices k and l are iterated over all physical channels for carrier 1 and 2, respectively, $P_{1,k}$ and $P_{2,l}$ are the absolute powers of channels k and l on the particular carrier, $P_{tot}$ is the total power of all channels on both carriers, and $CM\_offset_{i,j}$ is the aforementioned tentative compensating metric when channels k and l have channelization codes i and j, respectively. The normalization factor 4 emanates from the power relations used when deriving $CM\_offset_{i,j}$ above; that is, $P_{1,k}=P_{2,l}=P_{tot}/2$. The formula for CM_offset can be generalized to signals with more than two carriers, in which case the summation is then performed over all pairs of carriers that use the same scrambling code, and $P_{tot}$ is the total power of all channels on all carriers.

It can be noted that the expression for CM_offset is linear in the parameters $CM\_offset_{i,j}$. Consequently, as an alternative or refinement to the method of deriving $CM\_offset_{i,j}$ described earlier, these parameters can be derived by simulating a large set of dual-carrier configurations, recording the offset in Cubic metric due to identical spreading codes, and solving for the parameters $CM\_offset_{i,j}$ that minimize for example, a least-squares criterion. Using this approach, it is also possible to partly tailor the model for CM_offset such that the approximation error is smaller for some configurations that are deemed more important, by careful selection of what configurations to include in the simulation set.

By considering all the physical channels when determining the compensating metric adjustment value, as indicated by the expression for CM_offset above, simulations have shown that the typical residual approximation error after compensation can be reduced to below 0.1, compared to up to 0.5 dB residual approximation error when no compensation method is used.

There are several ways in which the expression for CM_offset above can be simplified. In one embodiment, only channels whose power is above a certain threshold are considered. In another embodiment, only pairs of channels whose product of (relative) powers satisfies a predetermined relationship with a predefined threshold (e.g., are greater than the predefined threshold) are considered. In yet another embodiment, only pairs of channel types whose tentative compensating metrics, $CM\_offset_{i,j}$, satisfy a predefined relationship with a predefined threshold value (e.g., their tentative compensating metrics, $CM\_offset_{i,j}$, are greater than a predefined threshold value) are considered. The various threshold values can be determined by simulation or experimentation, the threshold being set to achieve a desired level of accuracy. Similarly, the formula for CM_offset may be varied in several ways. It is, for example, not necessary that each term in the summation be proportional to the channel powers, but they could instead for example involve a quantization step or some other non-linear function of the channel powers. These simplifications and extensions are mentioned as non-limiting examples.

Figure 4:
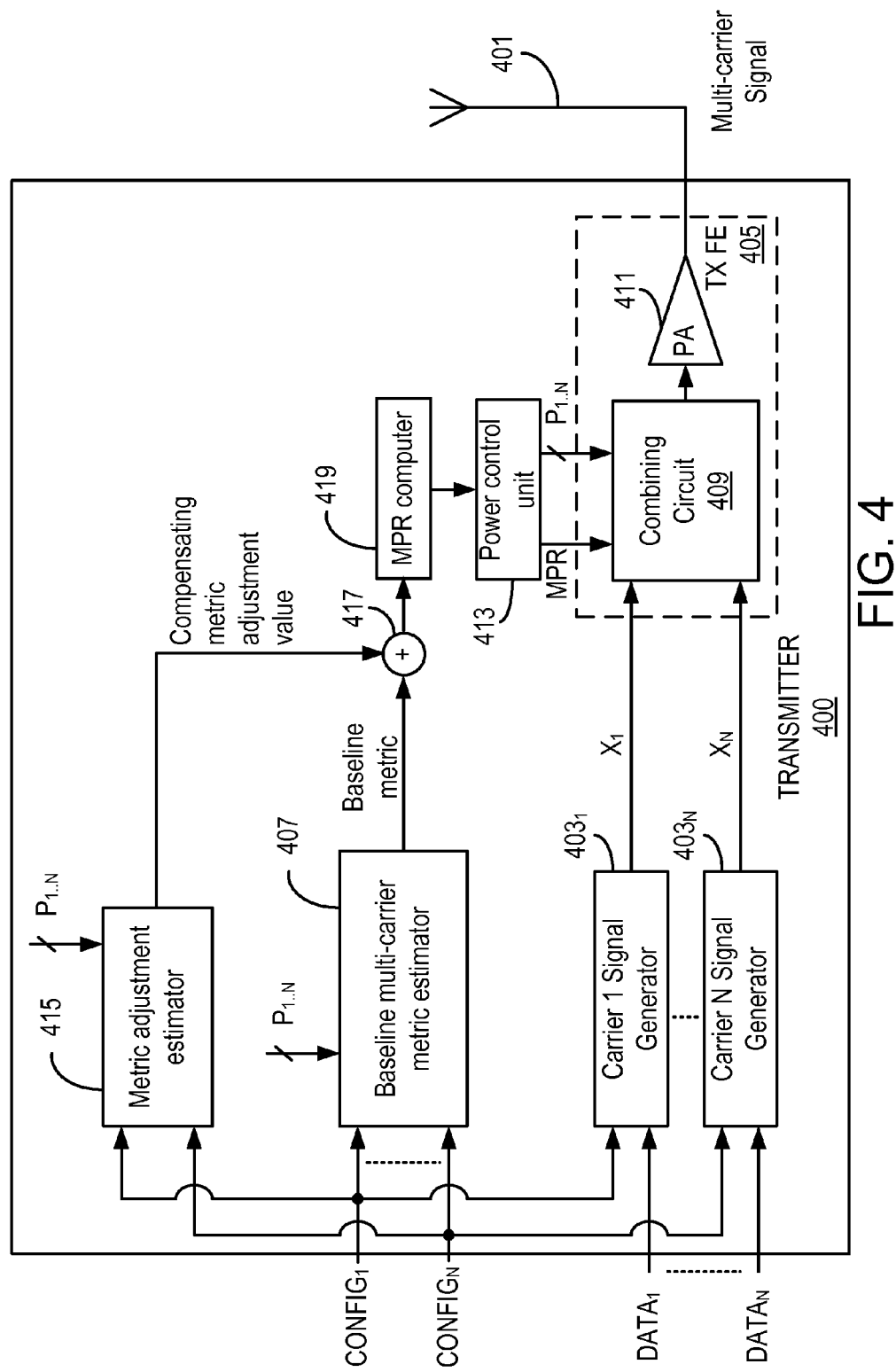
FIG. 4 is a block diagram of a transmitter 400 (e.g., part of a UE) illustrating aspects of embodiments consistent with the invention.

FIG. 4 is a block diagram of a transmitter 400 (e.g., part of a UE) illustrating aspects of embodiments consistent with the invention. The transmitter 400 is configured to transmit a multi-carrier signal via one or more antennas 401. The transmitter 400 includes a plurality, N, of signal generators 403, a transmitter front-end 405, a multi-carrier transmitter back-off baseline metric estimation circuit 407, and additional circuitry (described in detail below) that estimates a compensating metric adjustment value and applies the estimated value to the baseline metric value when the same scrambling code is used on two or more of the carriers.

Each signal generator $403_k$ ($1 \leq k \leq N$) spreads and modulates a different data signal $DATA_k$ onto a different one of N carriers, where each carrier k occupies a frequency region distinct from the other carriers. More particularly, a data signal $DATA_k$ represents all data to be transmitted on a certain carrier k, including both user information and control information. A signal generator $403_k$ performs channelization and scrambling of the data signal $DATA_k$ in accordance with a corresponding set of configuration parameters, $CONFIG_k$, specific to that carrier k (e.g., the used scrambling code together with the aforementioned characteristics of a channel configuration, e.g., the number and types of physical channels present, their gain factors (i.e., the physical channel's gain offset relative to other physical channels on the carrier k), modulation type, I/Q branch, spreading factors, and channelization codes or code numbers). The signal generator $403_k$ thereafter modulates the carrier k with the spread signal in a modulation process that is independent from that of the other signal generators 403 (e.g., by way of multiple, separately modulated, local oscillators; in alternative embodiments, the same oscillator can be used, even if the frequencies are different). The resulting modulated carrier $X_k$ is thereafter provided to the transmitter front-end 405, such that the front-end 405 receives N separately modulated carriers occupying distinct frequency regions.

A combining circuit 409 included in the transmitter front-end 405 aggregates these N carriers to form a multi-carrier signal. In doing so, the combining circuit 409 weighs together the carriers $X_1 \ldots X_N$ according to the intended transmit power $P_k$ on each carrier (where the sum of the intended transmit power $P_k$ on each carrier is less than or equal to a pre-determined nominal maximum transmit power $P_{max}$). Notably, this aggregation can cause the multi-carrier signal to exhibit certain undesired properties (e.g., a high PAPR or Cubed metric). These properties in turn cause a power amplifier 411, coupled to receive the output of the combining circuit 409, to generate more intermodulation products (i.e., unwanted frequencies) in the multi-carrier signal when operating at a given power level in the non-linear region. These unwanted frequencies, of course, contribute to the transmitter's out-of-band emissions.

According to aspects of the present invention, however, the combining circuit 409 reduces the multi-carrier signal's maximum transmit power by a certain amount; namely that of a back-off metric, in this example an MPR, provided to the combining circuit 409 by a power control unit 413. In reducing the maximum transmit power by the back-off metric MPR, the combining circuit 409 aims to suppress generation of intermodulation products and thereby achieve a pre-determined out-of-band emission requirement (referred to hereinafter as the $OOB_{req}$).

The power control unit 413 generates a suitable MPR value as follows: The baseline multi-carrier metric estimator 407 estimates a baseline metric value (e.g., Cubic metric) by known estimation techniques, such as but not limited to those disclosed in the above-referenced US Patent Publication No. US-2010/0239031. This technique involves:
1. Obtaining a carrier-specific metric (either by means of calculation or by table look-up) for each individual carrier. The metric obtained for each carrier k indicates, directly or indirectly, the amount by which the maximum transmit power on that carrier should be reduced from $P_{max}$, if transmitted alone, to achieve the $OOB_{req}$.
2. A baseline multi-carrier transmitter back-off metric is estimated based on the carrier-specific metrics obtained in step 1.

Notably, the techniques practiced by the baseline multi-carrier transmitter back-off metric estimation circuit 407 are derived with the underlying assumption that the scrambling codes are different for all of the carriers. However, when this is not the case, the baseline metric must be adjusted to improve accuracy. (For the sake of simplifying the drawing, circuitry that determines whether different scrambling codes are being used, and which then enables or disables baseline metric compensation is omitted. Those of ordinary skill in the art will readily understand, however, how to incorporate such circuitry into any practical embodiments.) Therefore, as explained above for example with reference to FIG. 3, a subset of the configuration parameters that will be considered when deriving the compensating adjustment value is selected and supplied to a metric adjustment estimator 415. The particular selection is application specific, and can be made, for example, in accordance with any of the various embodiments described above. The metric adjustment estimator 415 also receives the intended transmit power $P_k$ on each carrier.

The metric adjustment estimator 415 uses any one, or combination, of the techniques described above to produce a compensating metric adjustment value. Combining circuitry 417 applies the compensating metric adjustment value to the baseline metric value, and the resultant value is supplied to an MPR computer 419 which uses known techniques to generate an MPR value from the adjusted metric.

The adjusted metric is then supplied by the MPR computer 419 to the power control unit 413 which generates suitable control signals to control the transmit power of the transmitter front end 405, including controlling by how much the transmitter front end 405 is allowed to back off of its maximum power level.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a wireless communication transmitter configured to transmit a multi-carrier signal, the multi-carrier signal being an aggregation of two or more separately modulated carriers occupying distinct frequency regions, the method comprising:

obtaining a baseline multi-carrier metric indicative of an amount by which a multi-carrier signal's maximum transmit power should be reduced from a pre-determined nominal maximum transmit power to satisfy a predetermined out-of-band emission requirement when different scrambling codes are used on all carriers that are combined to create the multi-carrier signal;

estimating a compensating metric adjustment value that compensates for a multi-carrier metric estimation error that results from use of a same scrambling code on two or more of the carriers that are combined to create the multi-carrier signal;

obtaining a final multi-carrier metric indicative of the amount by which the multi-carrier signal's maximum transmit power should be reduced from the pre-determined nominal maximum transmit power to satisfy the predetermined out-of-band emission requirement by, under at least some circumstances, adjusting the baseline multi-carrier metric by an amount based on the compensating metric adjustment value when the same scrambling code is used on the two or more of the carriers that are combined to create the multi-carrier signal; and using the final multi-carrier metric to at least partially control a transmit power level of the wireless communication transmitter.

2. The method of claim 1, wherein obtaining the final multi-carrier metric comprises:

ascertaining whether the same scrambling code is used on the two or more of the carriers that are combined to create the multi-carrier signal;

using the baseline multi-carrier metric as the final multi-carrier metric if it is ascertained that different scrambling codes are used on all carriers that are combined to create the multi-carrier signal; and adjusting the baseline multi-carrier metric by the amount based on the compensating metric adjustment value when the same scrambling code is used on the two or more of the carriers that are combined to create the multi-carrier signal.

3. The method of claim 1, wherein obtaining the baseline multi-carrier metric comprises obtaining a multi-carrier cubic metric, a multi-carrier peak-to-average power ratio, or a multi-carrier maximum-power reduction value.

4. The method of claim 1, wherein estimating the compensating metric adjustment value comprises calculating the compensating metric adjustment value, or retrieving the compensating metric adjustment value from a lookup table, based at least in part on one or more configuration parameters of the multi-carrier signal.

5. The method of claim 4, wherein the one or more configuration parameters include gain factors for physical channels in a Wideband Code-Division Multiple Access (WCDMA) signal.

6. The method of claim 4, wherein the one or more configuration parameters include one or more power ratios between the two or more separately modulated carriers.

7. The method of claim 4, wherein the one or more configuration parameters include channelization codes of physical channels used by the multi-carrier signal.

8. The method of claim 4, wherein the one or more configuration parameters include a scrambling code of the multi-carrier signal.

9. The method of claim 4, wherein the compensating metric adjustment value is one of a set of constants.

10. The method of claim 9, wherein the constants are weighted depending on one or more power ratios between the two or more separately modulated carriers.

11. The method of claim 1, wherein adjusting the baseline multi-carrier metric by an amount based on the compensating metric adjustment value when the same scrambling code is used on the two or more of the carriers that are combined to create the multi-carrier signal comprises adding a bias to the baseline multi-carrier metric.

12. The method of claim 1, wherein estimating the compensating metric adjustment value that compensates for the multi-carrier metric estimation error that results from use of the same scrambling code on two or more of the carriers that are combined to create the multi-carrier signal comprises:

forming the compensating metric adjustment value, CM_offset, as a weighted sum of tentative compensating metrics for all pairs or a subset of all pairs of present channels with specific channelization codes, wherein weights applied in the weighted sum are a function of a relative power of each physical channel within the physical channel's carrier or are a function of a relative power of each physical channel within a total power of all carriers of the multi-carrier signal combined.

13. The method of claim 12, wherein:
the multi-carrier signal is an aggregation of two separately modulated carriers occupying distinct frequency regions, the two separately modulated carriers being herein denoted carrier 1 and carrier 2; and
forming the compensating metric adjustment value, CM_offset, is in conformance with:

$$\text{CM\_offset} = \sum_{k,l} \frac{P_{1,k} \, P_{2,l}}{P_{tot}^2} \cdot 4 \cdot \text{CM\_offset}_{i,j}$$

where the summation indices k and l are iterated over all physical channels for carrier 1 and 2 or a subset of all physical channels for carrier 1 and 2, respectively; $P_{1,k}$ and $P_{2,l}$ are absolute powers of channels k and l on respective carriers 1 and 2; $P_{tot}$ is a total power of all channels on both carriers; and $\text{CM\_offset}_{i,j}$ is the tentative compensating metric when channels k and l have channelization codes i and j, respectively.

14. The method of claim 12, wherein estimating the compensating metric adjustment value that compensates for the multi-carrier metric estimation error that results from use of the same scrambling code on two or more of the carriers that are combined to create the multi-carrier signal comprises:
forming the compensating metric adjustment value, CM_offset, as a weighted sum of tentative compensating metrics for all pairs of present channels whose power satisfies a predetermined relationship with a predetermined threshold value and that have specific channelization codes, wherein weights applied in the weighted sum are proportional to a relative power of each physical channel within the physical channel's carrier or are proportional to a relative power of each physical channel within a total power of all carriers of the multi-carrier signal combined.

15. The method of claim 12, wherein estimating the compensating metric adjustment value that compensates for the multi-carrier metric estimation error that results from use of the same scrambling code on two or more of the carriers that are combined to create the multi-carrier signal comprises:
forming the compensating metric adjustment value, CM_offset, as a weighted sum of tentative compensating metrics for all pairs of present channels whose tentative compensating metric satisfies a predetermined relationship with a predetermined threshold value and that have specific channelization codes, wherein weights applied in the weighted sum are proportional to a relative power of each physical channel within the physical channel's carrier or are proportional to a relative power of each physical channel within a total power of all carriers of the multi-carrier signal combined.

16. An apparatus for operating a wireless communication transmitter configured to transmit a multi-carrier signal, the multi-carrier signal being an aggregation of two or more separately modulated carriers occupying distinct frequency regions, the apparatus comprising:
circuitry configured to obtain a baseline multi-carrier metric indicative of an amount by which a multi-carrier signal's maximum transmit power should be reduced from a pre-determined nominal maximum transmit power to satisfy a predetermined out-of-band emission requirement when different scrambling codes are used on all carriers that are combined to create the multi-carrier signal;
circuitry configured to estimate a compensating metric adjustment value that compensates for a multi-carrier metric estimation error that results from use of a same scrambling code on two or more of the carriers that are combined to create the multi-carrier signal;
circuitry configured to obtain a final multi-carrier metric indicative of the amount by which the multi-carrier signal's maximum transmit power should be reduced from the pre-determined nominal maximum transmit power to satisfy the predetermined out-of-band emission requirement by, under at least some circumstances, adjusting the baseline multi-carrier metric by an amount based on the compensating metric adjustment value when the same scrambling code is used on the two or more of the carriers that are combined to create the multi-carrier signal; and
circuitry configured to use the final multi-carrier metric to at least partially control a transmit power level of the wireless communication transmitter.

17. The apparatus of claim 16, wherein the circuitry configured to obtain the final multi-carrier metric comprises:
circuitry configured to ascertain whether the same scrambling code is used on the two or more of the carriers that are combined to create the multi-carrier signal;
circuitry configured to use the baseline multi-carrier metric as the final multi-carrier metric if it is ascertained that different scrambling codes are used on all carriers that are combined to create the multi-carrier signal; and
circuitry configured to adjust the baseline multi-carrier metric by the amount based on the compensating metric adjustment value when the same scrambling code is used on the two or more of the carriers that are combined to create the multi-carrier signal.

18. The apparatus of claim 16, wherein the circuitry configured to obtain the baseline multi-carrier metric comprises circuitry configured to obtain a multi-carrier cubic metric, a multi-carrier peak-to-average power ratio, or a multi-carrier maximum-power reduction value.

19. The apparatus of claim 16, wherein the circuitry configured to estimate the compensating metric adjustment value comprises circuitry configured to calculate the compensating metric adjustment value, or to retrieve the compensating metric adjustment value from a lookup table, based at least in part on one or more configuration parameters of the multi-carrier signal.

20. The apparatus of claim 19, wherein the one or more configuration parameters include gain factors for physical channels in a Wideband Code-Division Multiple Access (WCDMA) signal.

21. The apparatus of claim 19, wherein the one or more configuration parameters include one or more power ratios between the two or more separately modulated carriers.

22. The apparatus of claim 19, wherein the one or more configuration parameters include channelization codes of physical channels used by the multi-carrier signal.

23. The apparatus of claim 19, wherein the one or more configuration parameters include a scrambling code of the multi-carrier signal.

24. The apparatus of claim 19, wherein the compensating metric adjustment value is one of a set of constants.

25. The apparatus of claim 24, wherein the constants are weighted depending on one or more power ratios between the two or more separately modulated carriers.

26. The apparatus of claim 16, wherein adjusting the baseline multi-carrier metric by an amount based on the compensating metric adjustment value when the same scrambling code is used on the two or more of the carriers that are combined to create the multi-carrier signal comprises adding a bias to the baseline multi-carrier metric.

27. The apparatus of claim 16, wherein the circuitry configured to estimate the compensating metric adjustment value that compensates for the multi-carrier metric estimation error that results from use of the same scrambling code on two or more of the carriers that are combined to create the multi-carrier signal comprises:
- circuitry configured to form the compensating metric adjustment value, CM_offset, as a weighted sum of tentative compensating metrics for all pairs or a subset of all pairs of present channels with specific channelization codes, wherein weights applied in the weighted sum are a function of a relative power of each physical channel within the physical channel's carrier or a function of a relative power of each physical channel within a total power of all carriers of the multi-carrier signal combined.

28. The apparatus of claim 27, wherein:
- the multi-carrier signal is an aggregation of two separately modulated carriers occupying distinct frequency regions, the two separately modulated carriers being herein denoted carrier 1 and carrier 2; and
- the circuitry configured to form the compensating metric adjustment value, CM_offset, does so in conformance with:

$$CM\_offset = \sum_{k,l} \frac{P_{1,k} \, P_{2,l}}{P_{tot}^2} \cdot 4 \cdot CM\_offset_{i,j}$$

where the summation indices k and l are iterated over all physical channels for carrier 1 and 2, or a subset of all physical channels for carrier 1 and 2, respectively; $P_{1,k}$ and $P_{2,l}$ are absolute powers of channels k and l on respective carriers 1 and 2; $P_{tot}$ is a total power of all channels on both carriers; and $CM\_offset_{i,j}$ is the tentative compensating metric when channels k and l have channelization codes i and j, respectively.

29. The apparatus of claim 27, wherein the circuitry configured to estimate the compensating metric adjustment value that compensates for the multi-carrier metric estimation error that results from use of the same scrambling code on two or more of the carriers that are combined to create the multi-carrier signal comprises:
- circuitry configured to form the compensating metric adjustment value, CM_offset, as a weighted sum of tentative compensating metrics for all pairs of present channels whose power satisfies a predetermined relationship with a predetermined threshold value and that have specific channelization codes, wherein weights applied in the weighted sum are proportional to a relative power of each physical channel within the physical channel's carrier or are proportional to a relative power of each physical channel within a total power of all carriers of the multi-carrier signal combined.

30. The apparatus of claim 27, wherein the circuitry configured to estimate the compensating metric adjustment value that compensates for the multi-carrier metric estimation error that results from use of the same scrambling code on two or more of the carriers that are combined to create the multi-carrier signal comprises:
- circuitry configured to form the compensating metric adjustment value, CM_offset, as a weighted sum of tentative compensating metrics for all pairs of present channels whose tentative compensating metric satisfies a predetermined relationship with a predetermined threshold value and that have specific channelization codes, wherein weights applied in the weighted sum are proportional to a relative power of each physical channel within the physical channel's carrier or are proportional to a relative power of each physical channel within a total power of all carriers of the multi-carrier signal combined.

* * * * *